United States Patent
Obara

(10) Patent No.: US 7,511,766 B2
(45) Date of Patent: Mar. 31, 2009

(54) VIDEO SIGNAL PROCESSING DEVICE AND METHOD FOR PROCESSING GRADATION STEP

(75) Inventor: Eiki Obara, Hiki-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 688 days.

(21) Appl. No.: 11/273,997

(22) Filed: Nov. 15, 2005

(65) Prior Publication Data

US 2006/0115173 A1    Jun. 1, 2006

(30) Foreign Application Priority Data

Nov. 30, 2004   (JP) .............................. 2004-346557

(51) Int. Cl.
*H04N 5/14* (2006.01)
(52) U.S. Cl. ....................................... 348/571; 348/671
(58) Field of Classification Search ................ 348/571, 348/574, 671, 708; 382/169, 254; 345/596, 345/690; *H04N 5/14, 9/64*
See application file for complete search history.

(56) References Cited

U.S. PATENT DOCUMENTS

| 5,414,527 A | 5/1995 | Koshi et al. |
| 6,724,430 B2 * | 4/2004 | Miyoshi et al. ............. 348/571 |
| 7,012,625 B1 * | 3/2006 | Kobayashi et al. .......... 348/671 |

FOREIGN PATENT DOCUMENTS

| JP | 2000-333028 | 11/2000 |
| JP | 2002-108298 | 4/2002 |

* cited by examiner

*Primary Examiner*—Sherrie Hsia
(74) *Attorney, Agent, or Firm*—Blakely, Sokoloff, Taylor & Zafman LLP

(57) ABSTRACT

In a horizontal-direction processing section, a comparing circuit sequentially compares pixel values of two adjacent pixels in a video image. A detecting circuit detects a horizontal flat region in which a difference between the pixel values compared by the comparing circuit is within a specified range. A horizontal boundary of the detected region is determined by the following processing. If a difference or the level (inclination) of a change in pixel value between two pixels adjacent to each other across the boundary is within a specified range, the boundary is determined to be a step in a gradation region. Vertically oriented processing is done same as processing of a horizontal direction.

6 Claims, 9 Drawing Sheets

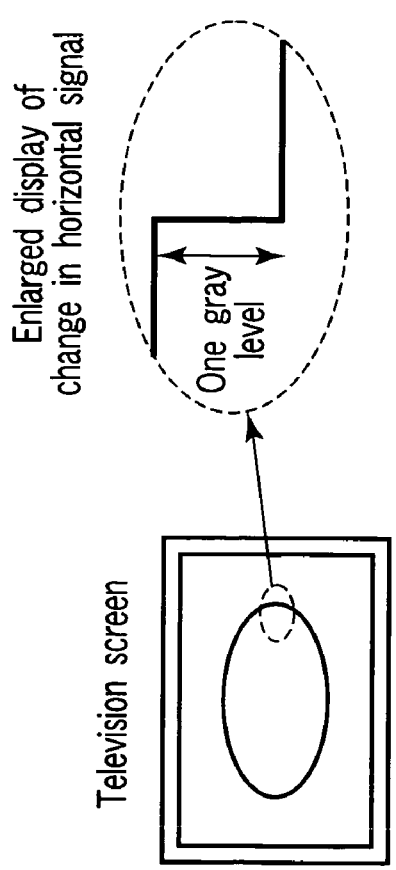
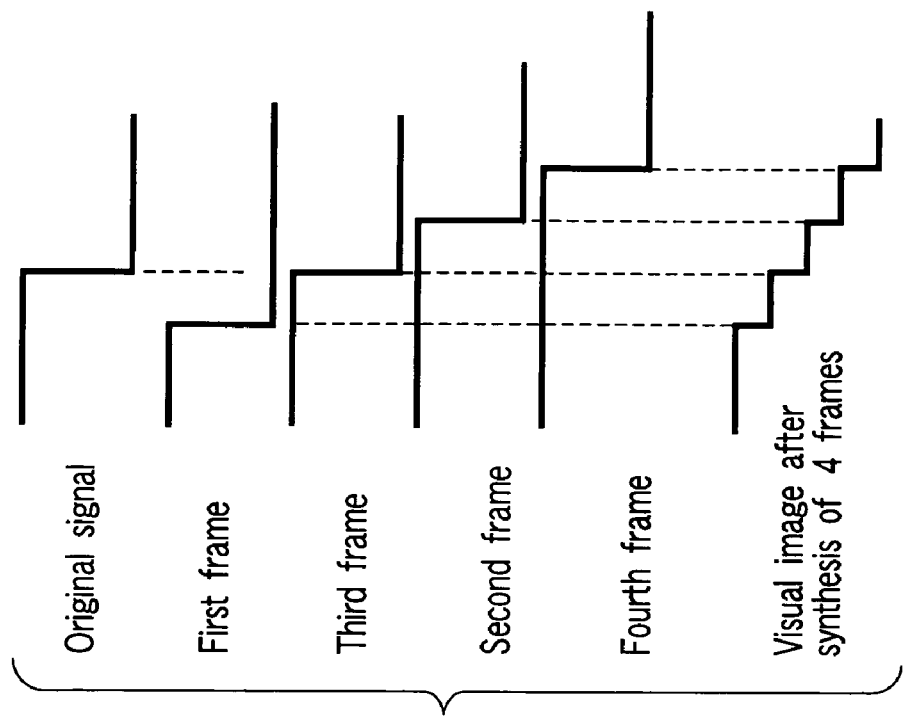
FIG. 4A
FIG. 4B
FIG. 4C

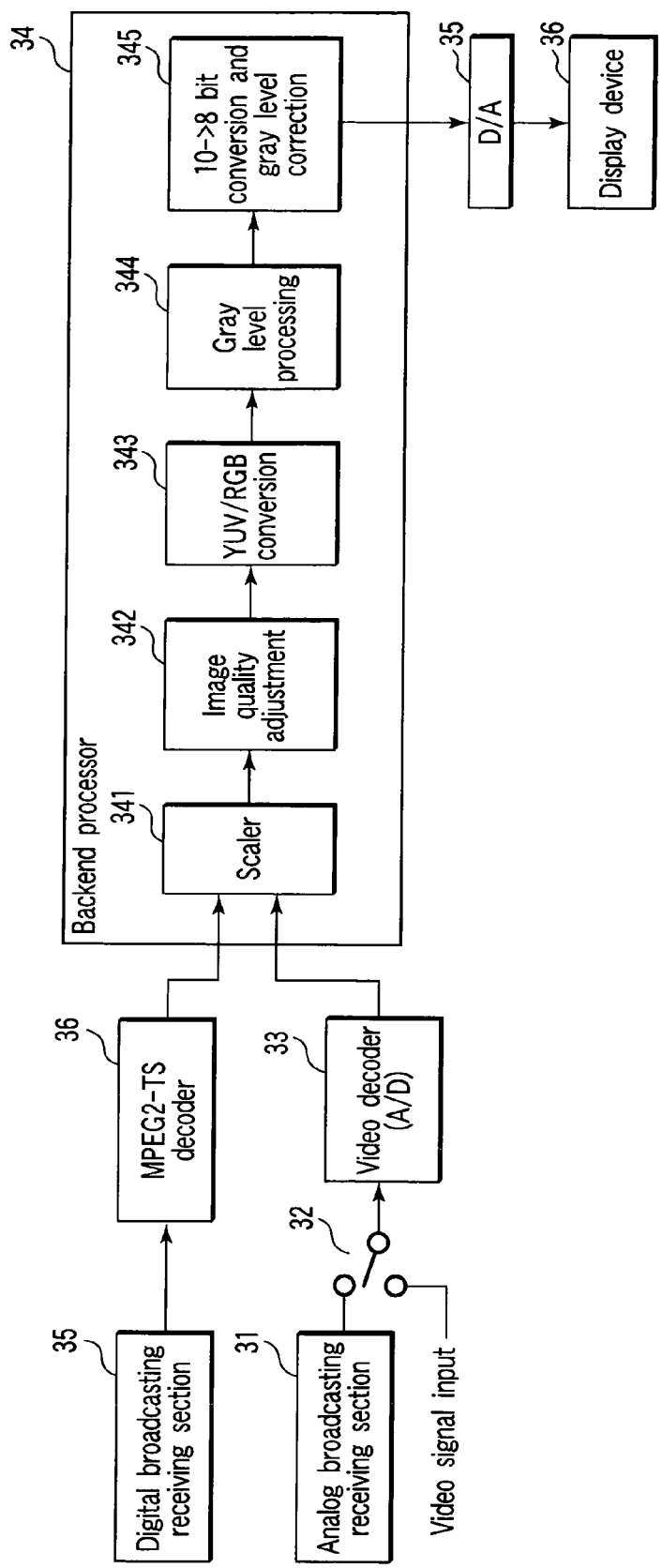
F I G. 5

VIDEO SIGNAL PROCESSING DEVICE AND METHOD FOR PROCESSING GRADATION STEP

CROSS-REFERENCE TO RELATED APPLICATIONS

This application is based upon and claims the benefit of priority from prior Japanese Patent Application No. 2004-346557, filed Nov. 30, 2004, the entire contents of which are incorporated herein by reference.

BACKGROUND OF THE INVENTION

1. Field of the Invention

The present invention relates to a video signal processing device that digitally processes a video signal, and in particular, to a method of processing a step in a gradation region in a display image, the method comprising detecting a step of a striped pattern created in the gradation region owing to the roughness of quantization of a video signal, to eliminate the striped pattern.

2. Description of the Related Art

In the prior art, video signal processing devices (commonly referred to as graphic boards) in personal computers (referred to as PCs below) mostly realize 8-bit-equivalent gray level expression by processing a video signal of grayscale 8-bit to finally convert it into grayscale 6-bit, using the removed 2 bits to execute a dither process, and outputting the processed data to a display. Video signal processing devices in television receivers (referred to as TVs below) based on digital processing realize 10-bit-equivalent gray level expression by processing a video signal of 10-bit grayscale to finally convert it into 8-bit grayscale, using the removed 2 bits to execute a dither (commonly referred to as frame rate control [FRC]) process called a magic square algorithm, and outputting the processed data to a display.

The conventional video signal processing devices uses the dither process to reduce the roughness of quantization of the video signal. However, with these video signal processing devices, in a gradation region where the gray level varies slowly, a marked step is created in a part of the image in which quantized bits are switched. This causes a striped pattern to be displayed.

An example of a technique relating to the present invention is a method for processing a digital signal which is disclosed in Jpn. Pat. Appln. KOKAI Publication No. 2002-108298; this method involves storing correction data for luminance nonuniformity occurring in a video on a screen for each of correction points provided at fixed intervals in the screen in horizontal and vertical directions and using the correction data to perform a nonlinear interpolation operation on a video signal to add the correction data to digital data. The proposed technique relates to a process for correcting luminance non-uniformity and cannot be utilized to avoid a step created in the gradation region because of the roughness of quantization of the video signal.

BRIEF SUMMARY OF THE INVENTION

As described above, the conventional PC and TV video signal processing devices reduce the roughness of quantization of the video signal. However, in the gradation region where the gray level varies slowly, a marked step is created in a part of the image in which quantized bits are switched. This causes a striped pattern to be displayed.

An object of the present invention is to provide a video signal processing device that detects a step of a striped pattern created in a gradation region in a display image owing to the roughness of quantization of a video signal, and to eliminate the striped pattern, as well as a method for processing a step in the gradation region.

According to a first aspect of the present invention, there is provided a video signal processing device comprising a horizontal-direction processor which processes a frame image in a quantized video signal in a horizontal direction and a vertical-direction processor which processes the frame image in a vertical direction, the horizontal-direction processor comprising: first gray level corrector configured to correct gray levels adjacent to each other across the horizontal boundary if the first determining unit determines the horizontal boundary to be a step in the gradation region, the vertical-direction processor comprising:

second comparator to compare sequentially pixel values of two pixels in the frame image which are adjacent to each other in the vertical direction;

second region detector to detect a region in which a difference between the pixel values compared by the second comparing means is within a specified range;

second determining unit configured to, if a difference or the level of a change in pixel value between two pixels adjacent to each other across a vertical boundary of the region detected by the second region detector is within a specified range, determining the vertical boundary to be a step in the gradation region or if the difference or the level of a change is out of the specified range, determining the vertical boundary to be a boundary of another region; and second gray level corrector configured to correct gray levels adjacent to each other across the vertical boundary if the second determining unit determines the vertical boundary to be a step in the gradation region.

According to a second aspect of the present invention, there is provided a method for processing a gradation step, the method being used for a video signal processing device which processes a frame image in a quantized video signal in horizontal and vertical directions, the image processing in the horizontal direction comprising: comparing sequentially first pixel values of two pixels in the frame image which are adjacent to each other in the horizontal direction; detecting a first region in which a difference between the first pixel values compared in the comparing is within a specified range; and determining, if a difference or the level of a change in pixel value between two pixels adjacent to each other across a horizontal boundary of the region detected in the first region is within a specified range, determining the horizontal boundary to be a step in the gradation region or if the difference or the level of a change is out of the specified range, determining the horizontal boundary to be a boundary of another region, the image processing in the vertical direction comprising: comparing sequentially second pixel values of two pixels in the frame image which are adjacent to each other in the horizontal direction; detecting a second region in which a difference between the second pixel values compared in the comparing is within a specified range; and determining, if a difference or the level of a change in pixel value between two pixels adjacent to each other across a horizontal boundary of the region detected in the second region is within a specified range, determining the horizontal boundary to be a step in the gradation region or if the difference or the level of a change is out of the specified range, determining the horizontal boundary to be a boundary of another region.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A, 4B, and 4C are conceptual drawings illustrating an interpolating process in a horizontal and vertical boundary gray level interpolating circuit shown in FIG. 2;

FIG. 5 is a block diagram showing a general configuration of a television receiver to which the present invention is applied.

DETAILED DESCRIPTION OF THE INVENTION

Embodiments of the present invention will be described below in detail with reference to the drawings.

First Embodiment

Figure 1:
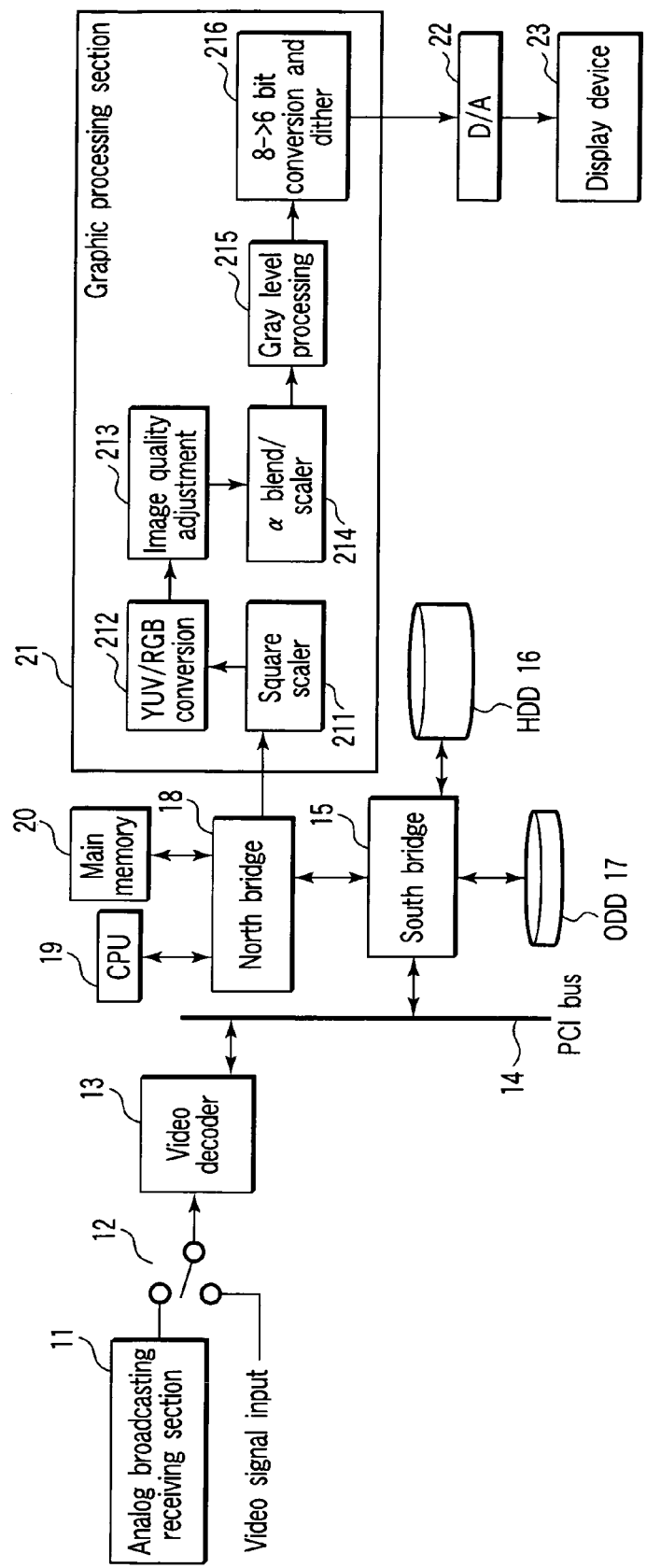
FIG. 1 is a block diagram showing a general configuration of a PC which can receive TV broadcasting and to which the present invention is applied.

FIG. 1 is a block diagram showing a general configuration of PC which can receive TV broadcasting and to which the present invention is applied. In FIG. 1, reference numeral 11 denotes a TV broadcast receiving section which receives a channel program specified by a user and which demodulates a TV signal to separate a video signal from a sound signal. The video signal is sent to a video decoder 13 via a switch 12. The switch 12 is used to select a TV video signal or a video signal from another video reproducing apparatus (for example, a DVD player).

The video decoder 13 converts an input video signal into a baseband signal (YUV) for digitization. On this occasion, the video signal is subjected to gray level expression using 8 bits. The digital video signal is sent to a south bridge 15 via a PCI bus 14. The south bridge 15 accommodates a hard disk device (HDD) 16, an optical disk device (ODD) 17, and the like to write or read input data in accordance with a control command for recording media. The south bridge 15 is connected to a north bridge 18. The north bridge 18 controls data processing in the south bridge 15 on the basis of a software process executed by a CPU (arithmetic processing unit) 19 and a main memory 20. That is, a video signal input to the south bridge is sent to the north bridge 18 on the basis of a control instruction from the north bridge 18. The video signal is thus subjected to image procession based on software. The processed signal is then sent to a graphic processing section 21.

A square scaler circuit 211 adjusts the shapes of pixels in the video signal input to the graphic processing section 21. A YUV/RGB converting circuit 212 then converts the format of the signal. An image quality adjusting circuit 213 adjusts the balance of image quality. An α blend/scaler circuit 214 changes the size of the image depending on the size of a display. Then, a gray level processing circuit 215 according to the present invention appropriately corrects gray levels. The gray level processing circuit 215 outputs a video signal. A bit converting and dithering circuit 216 changes the data size of the video signal to 6 bits and then dithers the signal. The signal is then sent to a display device 23 via a digital to analog converting section 22.

That is, the graphic processing section 21 in the above configuration executes video signal processing on 8-bit to convert the data into 6-bit for output and uses the removed 2 bits to dither an output video signal to obtain an 8-bit-equivalent gray level expression as in the case of the prior art. Accordingly, although in a pseudo sense, the actual maximum expressible gray level is equivalent to 8 bits for each of R, G, and B. In this case, a step of a striped pattern is created in a gradation region in the display image owing to the roughness of quantization. Thus, in the present invention, the gray level processing circuit 215 detects a step of a striped pattern created in the gradation region in the display image. Then, the image is appropriately corrected so as to make the step unmarked.

Figure 2:
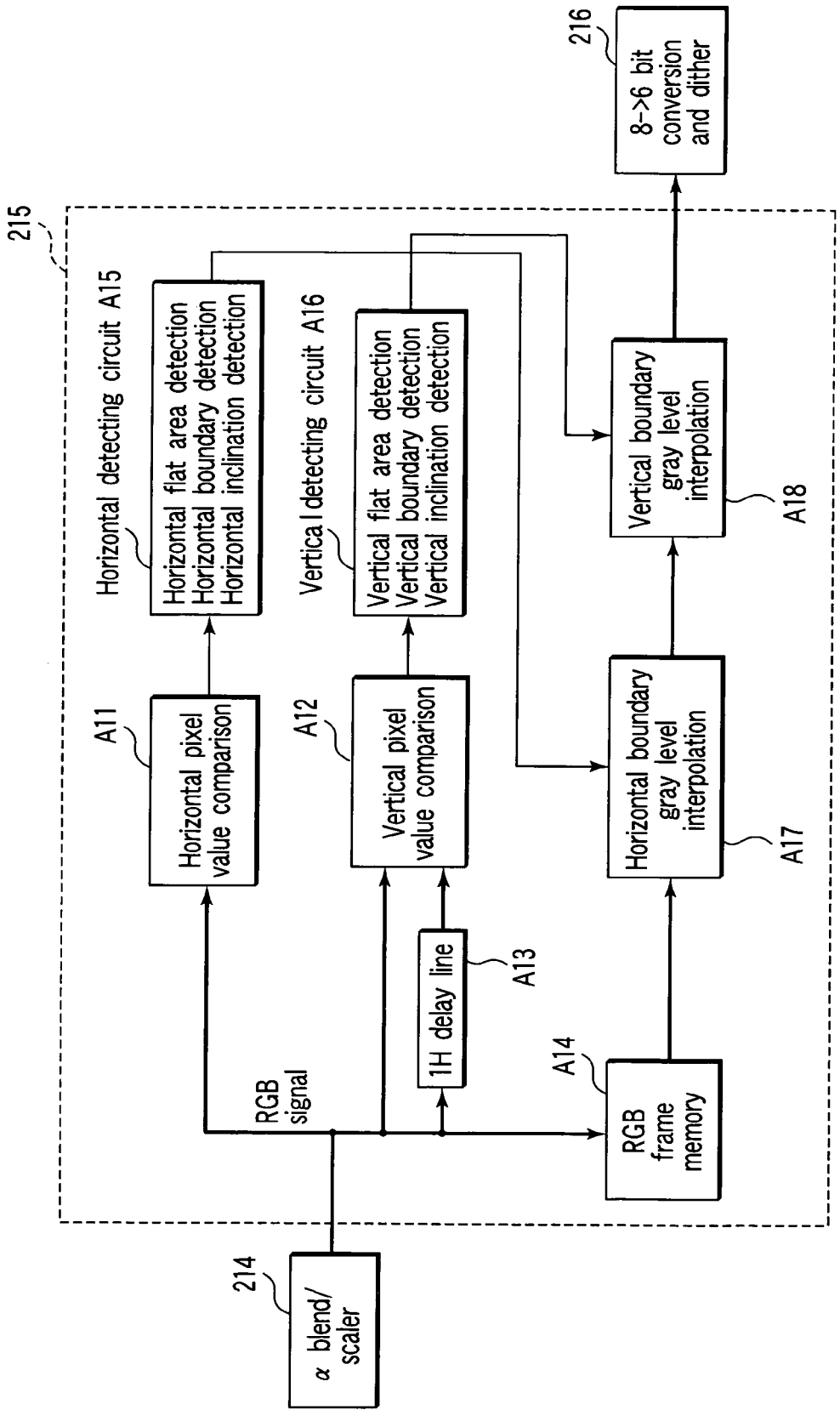
FIG. 2 is a block diagram showing a specific configuration of a gray level processing circuit according to the present invention which is used in the PC shown in FIG. 1.

FIG. 2 is a block diagram showing a specific configuration of the gray level processing circuit 215. In FIG. 2, the signal form of an input video signal is such that three types of signals, an R, G, and B signals, are input. However, for simplification, the description below will be given as if only one signal was input instead of the three signals.

In FIG. 2, an RGB signal output by the α blend scaler circuit 214 is input to each of a horizontal pixel value comparing circuit A11, a vertical pixel value comparing circuit A12, a 1H delay line A13, and an RGB frame memory circuit A14.

The horizontal pixel value comparing circuit A11 sequentially compares the pixel values of two adjacent pixels. A horizontal detecting circuit A15 uses the results of comparisons made by the comparing circuit A11 to detect a horizontal flat region, a horizontal boundary, and a horizontal inclination. Specifically, a horizontal flat region (gradation region) is detected in which the difference in pixel value between the pixels compared by the comparing circuit A11 is within a specified range. A horizontal boundary of the detected region is then determined. If the difference or the level of a change (inclination) in pixel value between the pixels adjacent to each other across the boundary is within the specified range, the horizontal boundary is determined to be a step in the gradation region. If the difference or the level of a change in pixel value between the pixels adjacent to each other across the boundary is out of the specified range, the horizontal boundary is determined to be a boundary of another region.

On the other hand, the vertical pixel value comparing circuit A12 loads a directly input RGB signal and an RGB signal delayed by 1H to sequentially compare the pixel values of two pixels arranged in a vertical direction. A vertical detecting circuit A16 uses the results of comparisons made by the comparing circuit A12 to detect a vertical flat region, a vertical boundary, and a vertical inclination. Specifically, a vertical flat region is detected in which the difference in pixel value between the pixels compared by the comparing circuit A12 is within a specified range. A vertical boundary of the detected region is then determined. If the difference or the level (inclination) of change in pixel value between the pixels adjacent to each other across the boundary is within the specified range, the vertical boundary is determined to be a step in the gradation region. If the difference in pixel value between the pixels adjacent to each other across the boundary is out of the specified range, the vertical boundary is determined to be a boundary of another region.

The RGB frame memory circuit A14 delays the input RGB frame by a time equal to one frame to provide a time required for the above comparing and detecting process. The gray level processing circuit 215 then outputs and sends the RGB signal delayed by the time equal to one frame to the bit converting and dithering circuit 216 via a horizontal boundary gray level interpolating circuit A17 and a vertical boundary gray level interpolating circuit A18.

In this case, if the horizontal detecting circuit A15 determines the boundary in the flat region to be a step in the gradation region, the horizontal boundary gray level interpolating circuit A17 executes a dither process on the pixels adjacent to each other across the boundary to make the step at the boundary unmarked. Likewise, if the vertical detecting circuit A16 determines the boundary in the flat region to be a step in the gradation region, the vertical boundary gray level interpolating circuit A18 executes a dither process on the pixels adjacent to each other across the boundary to make the step at the boundary unmarked.

The above process makes it possible to detect a step (boundary) of a striped pattern in the gradation region so as to distinguish the step from a boundary of a design. Then, the image can be corrected so as to make the boundary insignificant.

Figure 3A:
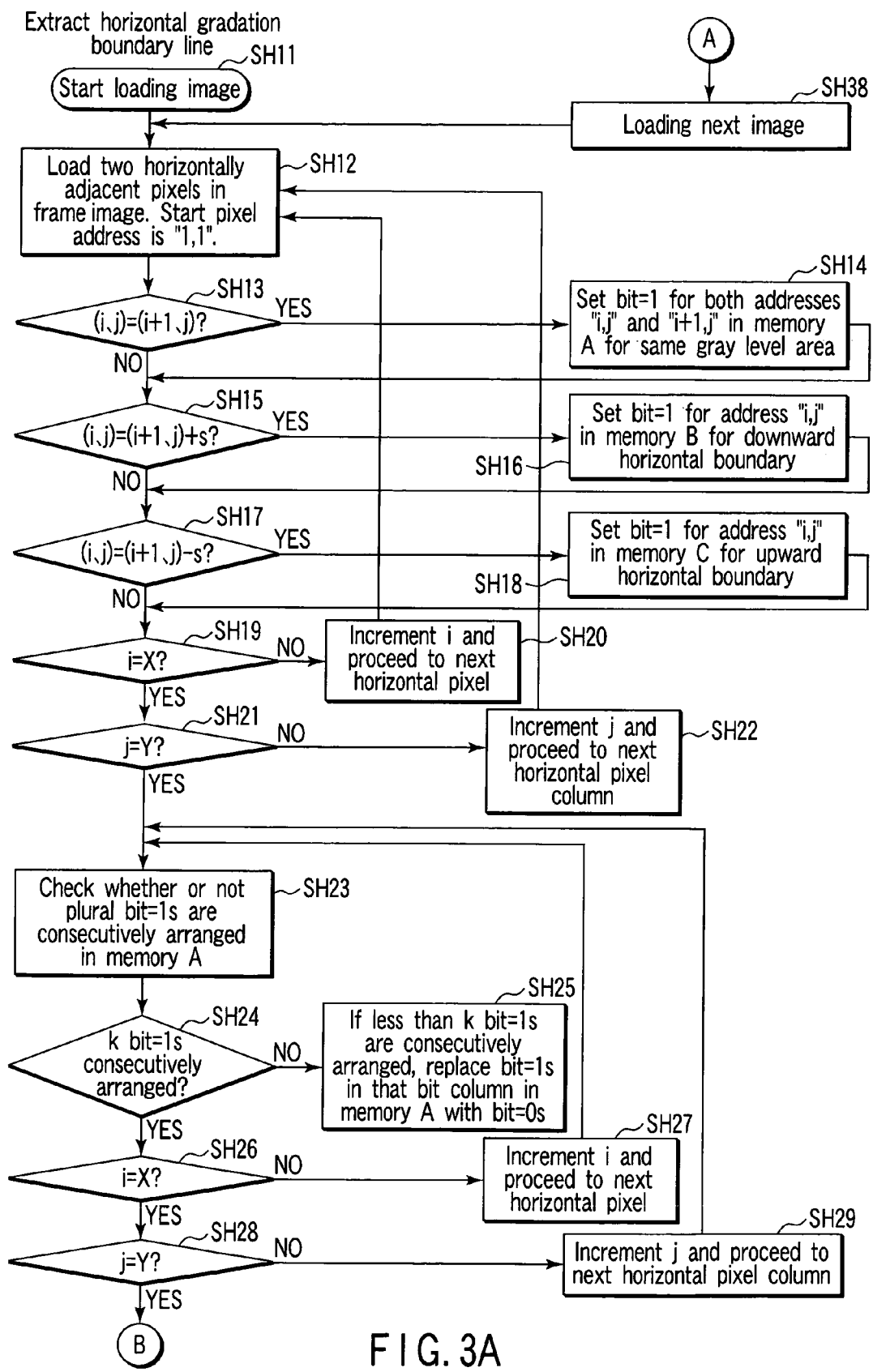
FIG. 3A is a flowchart showing an algorithm used to allow the gray level processing circuit shown in FIG. 2 to execute a gradation step detecting process in a horizontal direction on the basis of software processing.
Figure 3B:
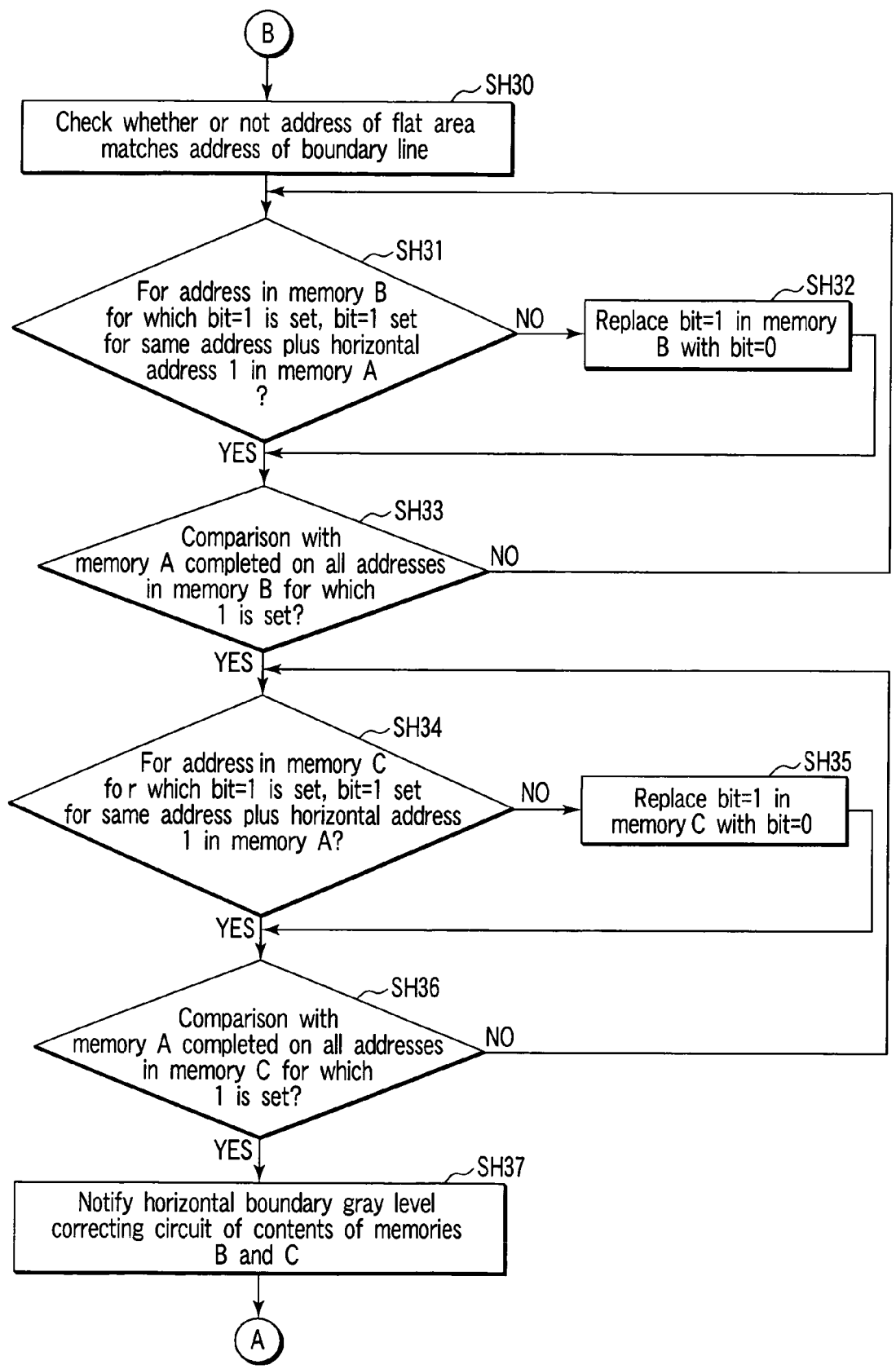
FIG. 3B is a flowchart showing an algorithm continued from FIG. 3A.
Figure 3C:
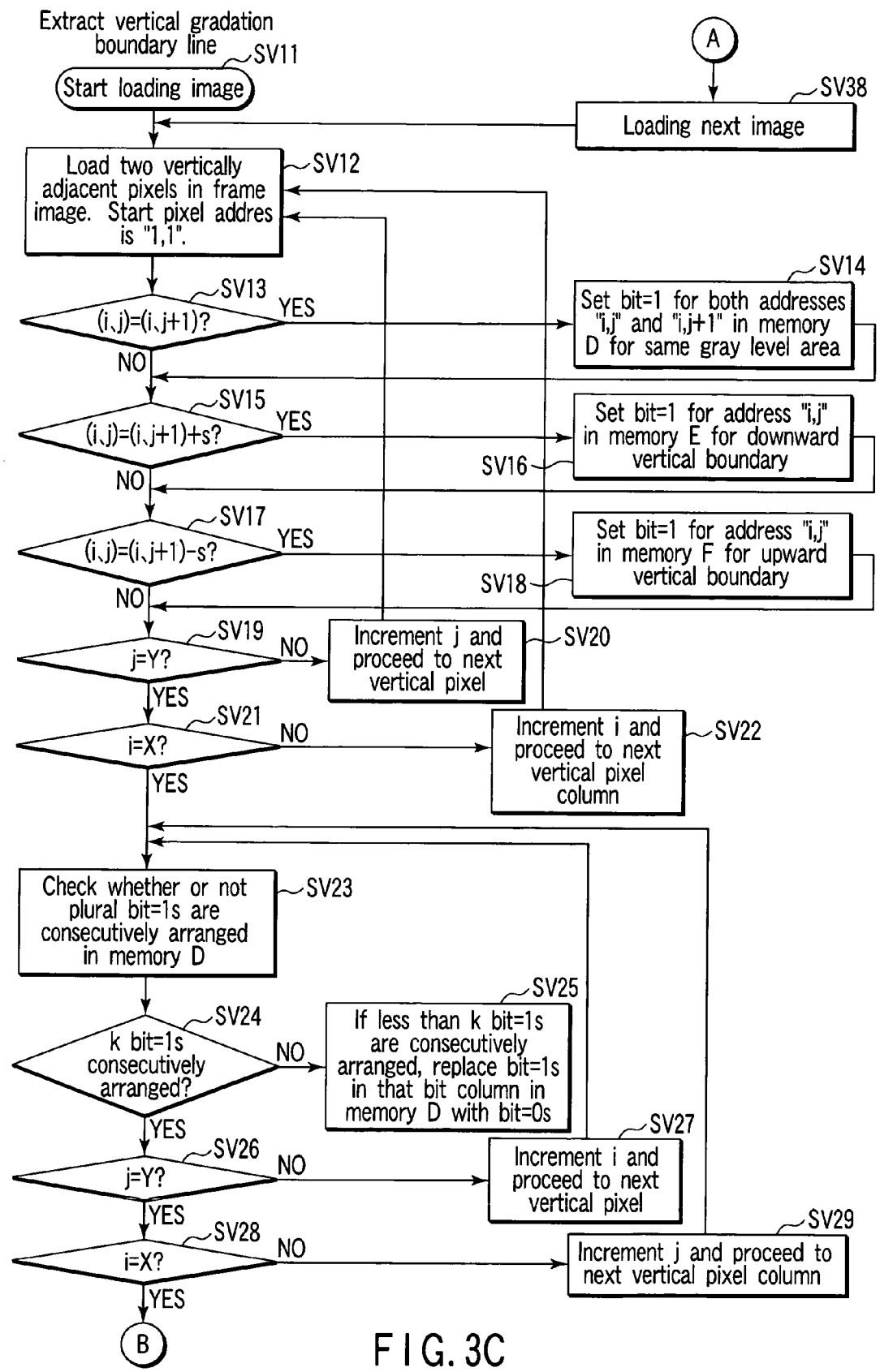
FIG. 3C is a flowchart showing an algorithm used to allow the gray level processing circuit shown in FIG. 2 to execute a gradation step detecting process in a vertical direction on the basis of software processing.
Figure 3D:
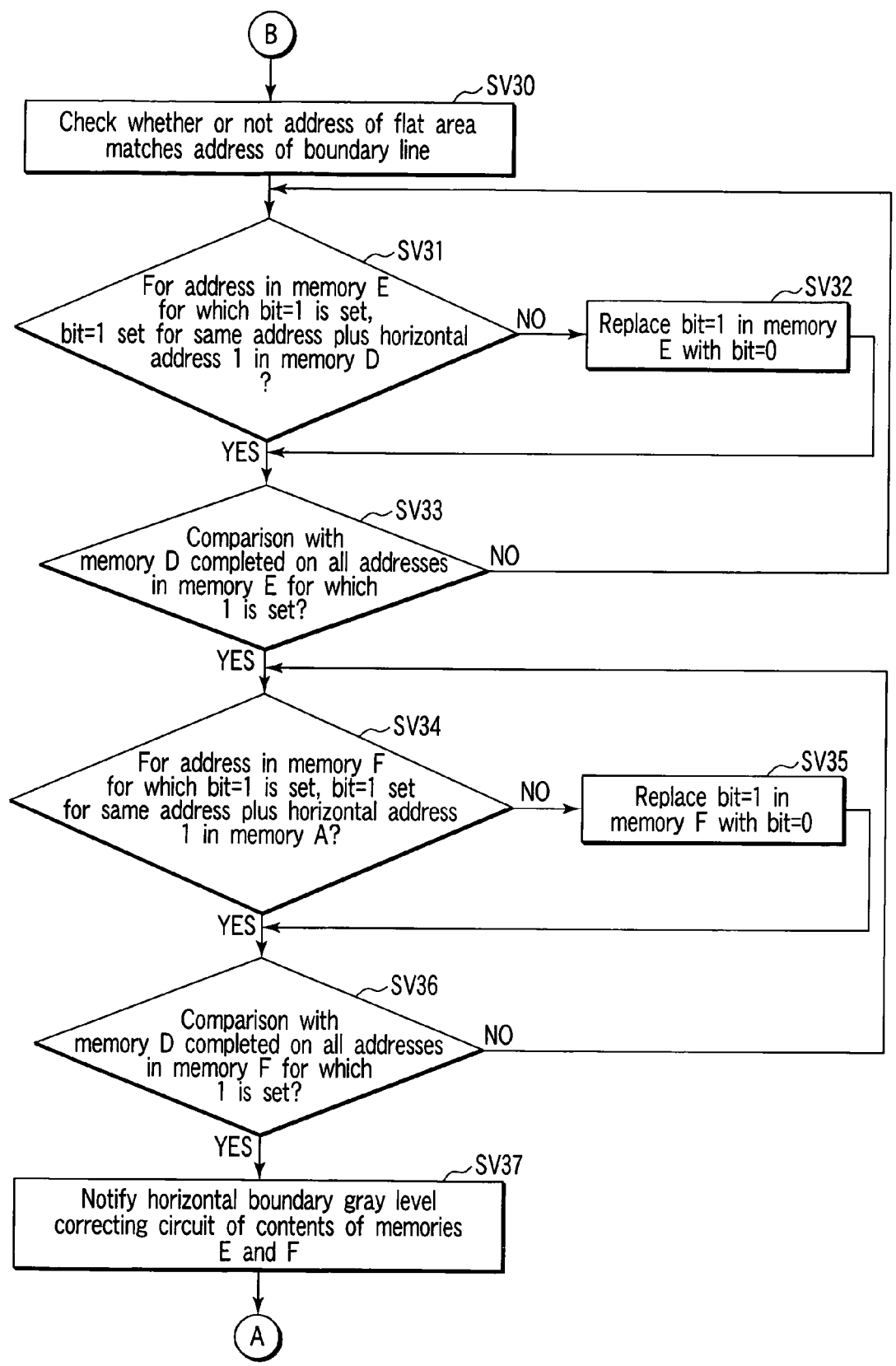
FIG. 3D is a flowchart showing an algorithm continued from FIG. 3C.

FIGS. 3A to 3D are flowcharts showing an algorithm used to allow the horizontal pixel value comparing circuit A11, horizontal detecting circuit A15, vertical pixel value comparing circuit A12, and vertical detecting circuit A16 of the gray level processing circuit 215 to execute a gradation step detecting process on the basis of software processing. FIGS. 3A and 3B show an example of a gradation step detecting process in the horizontal direction. FIGS. 3C and 3D show an example of a gradation step detecting process in the vertical direction. In this case, it is assumed that image data is stored in the RGB frame memory circuit A14 and that an image space is composed of horizontal X pixels and vertical Y pixels. An example of notation will be described below. "i, j" denotes a horizontal and vertical addresses in the memory. (i, j) denotes the pixel values of the address "i, j", and s denotes the number of gray level steps. A memory A is a storage memory for the same gray level area in the horizontal direction. A memory B is a downward horizontal boundary line storage memory. A memory C is an upward boundary line storage memory. A memory D is a storage memory for the same gray level area in the vertical direction. A memory E is a downward vertical boundary line storage memory. A memory F is an upward boundary line storage memory.

First, a description will be given of the gradation step detecting process in the horizontal direction.

In FIGS. 3A and 3B, in step SH11, an image starts to be loaded. Then, in step SH12, two horizontally adjacent pixels (i, j) and (i+1, j) are loaded from the frame image. A start pixel address is "1, 1". Subsequently, in step SH14, the device determines whether or not (i, j)=(i+1, j). If the determination is negative, the process proceeds to step SH15. If the determination is affirmative, the process proceeds to step SH14. In step SH14, bit=1 is set for both the address "i, j" and the address "i+1, j" in the memory A for the horizontal X and vertical Y matching an image space stored for detection of the same gray level area. The process then proceeds to step SH15.

In step SH15, the device determines whether (i, j)=(i+1, j)+s. If the determination is negative, the process proceeds to step SH17. If the determination is affirmative, the process proceeds to step SH16. In step SH16, bit=1 is set for the address "i, j" in the memory B for the horizontal X and vertical Y matching an image space stored for detection of a downward horizontal boundary. The process then proceeds to step SH17.

In step SH17, the device determines whether or not (i, j)=(i+1, j)−s. If the determination is negative, the process proceeds to step SH19. If the determination is affirmative, the process proceeds to step SH18. In step SH18, bit=1 is set for the address "i, j" in the memory C for the horizontal X and vertical Y matching an image space stored for detection of an upward horizontal boundary. The process then proceeds to step SH19.

In step SH19, the device determines whether or not i=X has been reached. If i=X has not been reached (NO), then in step SH20, the device increments i to advance to the next horizontal pixel and returns to step SH12. If i=X has been reached (YES), the process shifts to step SH21 to determine whether or not j=Y has been reached. If j=Y has not been reached (NO), then in step SH22, the device increments j to advance to the next horizontal pixel column and returns to step SH12.

If the device determines in step SH21 that j=Y has been reached (YES), the process proceeds to step SH23. In step SH23, the device checks whether or not a plurality of bit=1s are consecutively arranged in the memory A. Then, in step SH24, the device determines whether or not at least k bit=1s are consecutively arranged. If at least k bit=1s are consecutively arranged (YES), the process proceeds to step SH26. If at least k bit=1s are not consecutively arranged (NO), then in step SH25, bit=1s in the less than k bit columns are replaced with bit=0s. The process then proceeds to step SH26.

In step SH26, the device determines whether or not i=X has been reached. If i=X has not been reached (NO), then in step SH27, the device increments i to advance to the next horizontal pixel and returns to step SH23. If i=X has been reached (YES), the process shifts to step SH28 to determine whether or not j=Y has been reached. If j=Y has not been reached (NO), then in step SH29, the device increments j to advance to the next horizontal pixel column and returns to step SH23.

If the device determines in step SH28 that j=Y has been reached (YES), the process proceeds to step SH30 to check whether or not the address of the flat area matches the address of the boundary line. In this case, in step SH31, the device determines whether or not for the address for which bit=1 is set in the memory B, bit=1 is set for the same address plus a horizontal address 1 in the memory A. If bit=1 is set (YES), the process proceeds to step SH33. If bit=1 is not set (NO), then in step SH32, the process replaces bit=1 in the memory B with bit=0 and proceeds to step SH33. In step SH33, the device determines whether or not comparison with the memory A has been completed on all the addresses in the memory B for which 1 is set. If comparison has not been completed on all the addresses (NO), the process returns to step SH31. If comparison has been completed on all the addresses (YES), the process returns to step SH34.

In step SH34, the device determines whether or not for the address for which bit=1 is set in the memory C, bit=1 is set for the same address plus a horizontal address 1 in the memory A. If bit=1 is set (YES), the process proceeds to step SH36. If bit=1 is not set (NO), then in step SH35, the process replaces bit=1 in the memory C with bit=0 and proceeds to step SH36. In step SH36, the device determines whether or not comparison with the memory A has been completed on all the addresses in the memory C for which 1 is set. If comparison has not been completed on all the addresses (NO), the process returns to step SH34. If comparison has been completed on all the addresses (YES), the process returns to step SH37.

In step SH37, the horizontal boundary gray level correcting circuit A17 is notified of the contents of the memories B and C. In step SH38, the process loads the next image and returns to step SH12. This completes the gradation step detecting process in the horizontal direction.

Now, description will be given of the gradation step detecting process in the vertical direction.

In FIGS. 3C and 3D, in step SV11, an image starts to be loaded. Then, in step SV12, two vertically adjacent pixels (i, j) and (i, j+1) are loaded from the frame image. A start pixel address is "1, 1". Subsequently, in step SV14, the device determines whether or not (i, j)=(i, j+1). If the determination is negative, the process proceeds to step SV15. If the determination is affirmative, the process proceeds to step SV14. In step SV14, bit=1 is set for both the address "i, j" and the address "i, j+1" in the memory D for the horizontal X and vertical Y matching an image space stored for detection of the same gray level area. The process then proceeds to step SV15.

In step SV15, the device determines whether (i, j)=(i, j+1)+s. If the determination is negative, the process proceeds to step SV17. If the determination is affirmative, the process proceeds to step SV16. In step SV16, bit=1 is set for the address "i, j" in the memory B for the horizontal X and vertical Y matching an image space stored for detection of a downward vertical boundary. The process then proceeds to step SV17.

In step SV17, the device determines whether or not (i, j)=(i+1, j)−s. If the determination is negative, the process proceeds to step SV19. If the determination is affirmative, the process proceeds to step SV18. In step SV18, bit=1 is set for the address "i, j" in the memory F for the horizontal X and vertical Y matching an image space stored for detection of an upward vertical boundary. The process then proceeds to step SV19.

In step SV19, the device determines whether or not j=Y has been reached. If j=Y has not been reached (NO), then in step SV20, the device increments j to advance to the next vertical pixel and returns to step SV12. If j=Y has been reached (YES), the process shifts to step SV21 to determine whether or not i=X has been reached. If i=X has not been reached (NO), then in step SV22, the device increments i to advance to the next vertical pixel column and returns to step SV12.

If the device determines in step SV21 that i=X has been reached (YES), the process proceeds to step SV23. In step SV23, the device checks whether or not a plurality of bit=1s are consecutively arranged in the memory D. Then, in step SV24, the device determines whether or not at least k bit=1s are consecutively arranged. If at least k bit=1s are consecutively arranged (YES), the process proceeds to step SV26. If at least k blt=1s are not consecutively arranged (NO), then in step SV25, bit=1s in the less than k bit columns are replaced with bit=0s. The process then proceeds to step SV26.

In step SV26, the device determines whether or not j=Y has been reached. If j=Y has not been reached (NO), then in step SV27, the device increments j to advance to the next vertical pixel and returns to step SV23. If j=Y has been reached (YES), the process shifts to step SV28 to determine whether or not i=X has been reached. If i=X has not been reached (NO), then in step SV29, the device increments i to advance to the next vertical pixel column and returns to step SV23.

If the device determines in step SV28 that i=X has been reached (YES), the process proceeds to step SV30 to check whether or not the address of the flat area matches the address of the boundary line. In this case, in step SV31, the device determines whether or not for the address for which bit=1 is set in the memory E, bit=1 is set for the same address plus a vertical address 1 in the memory D. If bit=1 is set (YES), the process proceeds to step SV33. If bit=1 is not set (NO), then in step SV32, the process replaces bit=1 in the memory E with bit=0 and proceeds to step SV33. In step SV33, the device determines whether or not comparison with the memory D has been completed on all the addresses in the memory E for which 1 is set. If comparison has not been completed on all the addresses (NO), the process returns to step SV31. If comparison has been completed on all the addresses (YES), the process returns to step SV34.

In step SV34, the device determines whether or not for the address for which bit=1 is set in the memory F, bit=1 is set for the same address plus a vertical address 1 in the memory D. If bit=1 is set (YES), the process proceeds to step SV36. If bit=1 is not set (NO), then in step SV35, the process replaces bit=1 in the memory F with bit=0 and proceeds to step SV36. In step SV36, the device determines whether or not comparison with the memory D has been completed on all the addresses in the memory F for which 1 is set. If comparison has not been completed on all the addresses (NO), the process returns to step SV34. If comparison has been completed on all the addresses (YES), the process returns to step SV37.

In step SV37, the vertical boundary gray level correcting circuit A18 is notified of the contents of the memories E and F. In step SV38, the process loads the next image and returns to step SV12. This completes the gradation step detecting process in the horizontal direction.

Subsequently, with reference to FIGS. 4A, 4B, and 4C, description will be given of interpolating processes executed by the horizontal and vertical boundary gray level interpolating circuits A17 and A18.

It is assumed that an elliptic stripe slightly brighter than a background color is projected in a central part of a screen of the display device 23 as shown in FIG. 4A. The difference in brightness is assumed to correspond to one gray level (in the case of quantized 8 bits, 1/256 of a dynamic range). Then, such a step as shown in the enlarged view of a signal in FIG. 4B is created in the horizontal part at the boundary between a bright area and a dark area. The horizontal detecting circuit A15 detects the position of the boundary and the inclination of brightness as described in FIGS. 3A to 3D. Accordingly, a dither process is executed on the boundary so as to assign the position of the boundary to each frame (in the example shown in FIGS. 4A and 4B, at the boundary, the frames incline toward the darker area, from the left to right of the screen).

That is, as shown in FIG. 4C, for an original signal, the position of the boundary is assigned to a first frame, a second frame, a third frame, and a fourth frame, that is, at a period of four frames. Then, the position of the boundary corresponds to a visual image obtained by synthesizing the four frames together, that is, a fine gray level expression showing each quarter gray level. In this case, although signal processing is based on 8 bits, the vicinity of the boundary can be expressed in 10 bits. By performing such an operation on the entire boundary in the horizontal and vertical directions, it is possible to make insignificant a striped pattern resulting from quantization.

Therefore, a PC comprising the gray level processing circuit 215 configured as described above can detect a step of a striped pattern created in the gradation region in the display image owing to the roughness of quantization of a video signal. The PC can thus acquire the difference in pixel value at the boundary and inclination information. Consequently, an appropriate gray level interpolation can be executed to make the step insignificant.

In the description of the above embodiment, the gray level processing is executed using the RGB signal. However, of course, similar effects can be produced using a YUV signal.

Second Embodiment

The present invention is also applicable to a television receiver. FIG. 5 shows the configuration in which the present invention is applied to a television receiver.

In FIG. 5, a switch 32 arbitrarily switches between a video signal output from an analog broadcast receiving section 31 and a video signal line input. A video decoder circuit 33 then digitizes the output or input into a baseband signal (YUV), which is then sent to a backend processor 34. On the other hand, an MPEG2-TS decoder circuit 36 demodulates a digital broadcast signal received by a digital broadcasting receiving section 35, into a video signal, which is similarly sent to the backend processor 34.

Figure 6:
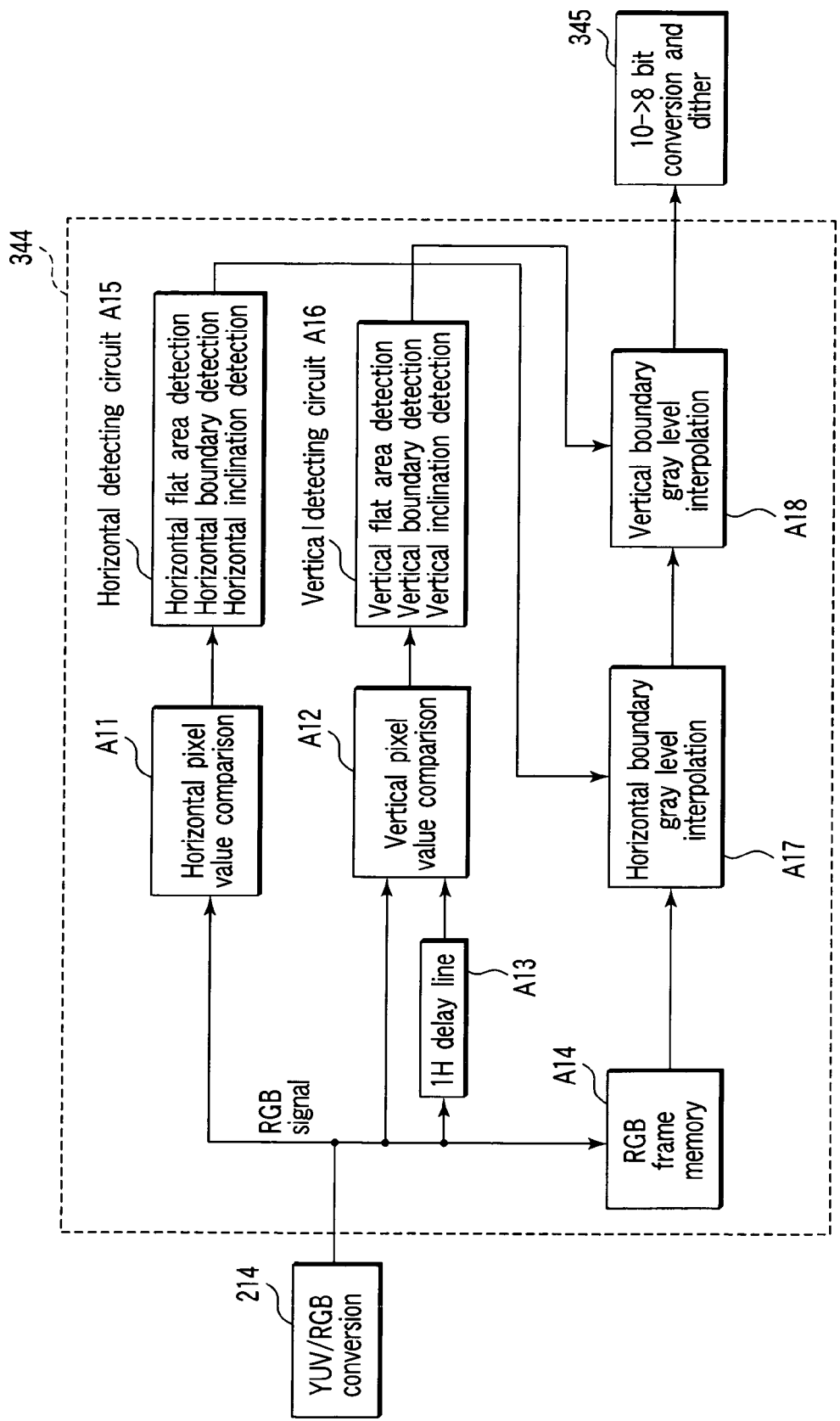
FIG. 6 is a block diagram showing a specific configuration of a gray level processing circuit according to the present invention which is used in the television receiver shown in FIG. 5.

A scaler circuit 341 adjusts the image size of each video signal input to the backend processor 34. An image quality adjusting circuit 342 adjusts the image quality of the video signal. A YUV-RGB converting circuit 343 converts the resulting signal into an RGB signal. Then, a gray level processing circuit 344 according to the present invention corrects a gradation step. Finally, a bit converting and gray level correcting circuit 345 removes 2 bits. The gray level is then corrected by frame rate control (FRC). The digital to analog converting section 35 converts the gray level-corrected signal into an analog signal, which is then sent to a display section 36. The gray level processing circuit 344 is configured as shown in FIG. 6. However, the circuit configuration is similar to that shown in FIG. 2. The same components as those shown in FIG. 2 have the same reference numerals and their description is omitted.

In the television receiver configured as described above, the backend processor 34 processes a video signal of 10 bits and finally converts the signal into 8 bits. The gray level is then corrected. The maximum value for internal gray level expression is 10 bits, which is thus a limit. In the processor 34, the gray level processing circuit 344 according to the present invention is placed in front of the final bit converting and gray level correcting circuit 345. The gray level processing circuit 344 detects a step (boundary) in the gradation region and executes a dither process on the boundary as shown in, for example, FIGS. 4A to 4C. Thus, the boundary is expressed in 12 bits to make the step in the gradation region insignificant. This realizes a visually very smooth gradation display.

In the description of the present embodiment, the RGB signal is subjected to the gradation process. However, similar effects are produced using a YUV signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video signal processing device comprising a horizontal-direction processor which processes a frame image in a quantized video signal in a horizontal direction and a vertical-direction processor which processes the frame image in a vertical direction, the horizontal-direction processor comprising:

first comparator configured to compare sequentially pixel values of two pixels in the frame image which are adjacent to each other in the horizontal direction;

first region detector configured to detect a region in which a difference between the pixel values compared by the first comparator is within a specified range;

first determining unit configured to, if a difference or the level of a change in pixel value between two pixels adjacent to each other across a horizontal boundary of the region detected by the first region detector is within a specified range, determine the horizontal boundary to be a step in the gradation region or if the difference or the level of a change is out of the specified range, determine the horizontal boundary to be a boundary of another region; and first gray level corrector configured to correct gray levels adjacent to each other across the horizontal boundary if the first determining unit determines the horizontal boundary to be a step in the gradation region, the vertical-direction processor comprising:

second comparator to compare sequentially pixel values of two pixels in the frame image which are adjacent to each other in the vertical direction;

second region detector to detect a region in which a difference between the pixel values compared by the second comparing means is within a specified range;

second determining unit configured to, if a difference or the level of a change in pixel value between two pixels adjacent to each other across a vertical boundary of the region detected by the second region detector is within a specified range, determining the vertical boundary to be a step in the gradation region or if the difference or the level of a change is out of the specified range, determining the vertical boundary to be a boundary of another region; and second gray level corrector configured to correct gray levels adjacent to each other across the vertical boundary if the second determining unit determines the vertical boundary to be a step in the gradation region.

2. The video signal processing device according to claim 1, wherein each of the first and second gray level corrector executes a dither process on pixels adjacent to each other across the boundary.

3. The video signal processing device according to claim 2, wherein the dither process is based on the difference in pixel value between the pixels adjacent to each other across the boundary or the level of a change in pixel value.

4. A method for processing a gradation step, the method being used for a video signal processing device which processes a frame image in a quantized video signal in horizontal and vertical directions, the image processing in the horizontal direction comprising:

comparing sequentially first pixel values of two pixels in the frame image which are adjacent to each other in the horizontal direction;

detecting a first region in which a difference between the first pixel values compared in the comparing is within a specified range; and determining, if a difference or the level of a change in pixel value between two pixels adjacent to each other across a horizontal boundary of the region detected in the first region is within a specified range, determining the horizontal boundary to be a step in the gradation region or if the difference or the level of a change is out of the specified range, determining the horizontal boundary to be a boundary of another region, the image processing in the vertical direction comprising:

comparing sequentially second pixel values of two pixels in the frame image which are adjacent to each other in the horizontal direction;

detecting a second region in which a difference between the second pixel values compared in the comparing is within a specified range; and determining, if a difference or the level of a change in pixel value between two pixels adjacent to each other across a horizontal boundary of the region detected in the second region is within a specified range, determining the horizontal boundary to be a step in the gradation region or if the difference or the level of a change is out of the specified range, determining the horizontal boundary to be a boundary of another region.

5. The method according to claim 1, further comprising:

correcting first gray levels adjacent to each other across the horizontal boundary if the determining determines the horizontal boundary to be a step in the gradation region; and correcting second gray levels adjacent to each other across the vertical boundary if the determining determines the vertical boundary to be a step in the gradation region;

wherein each of the correcting the first and second gray level executes a dither process on pixels adjacent to each other across the boundary.

6. The method according to claim 5, wherein the dither process is based on the difference in pixel value between the pixels adjacent to each other across the boundary or the level of a change in pixel value.

* * * * *